United States Patent [19]
Abdelmalek et al.

[11] Patent Number: 5,642,630
[45] Date of Patent: Jul. 1, 1997

[54] PROCESS FOR SOLIDS WASTE LANDFILL GAS TREATMENT AND SEPARATION OF METHANE AND CARBON DIOXIDE

[76] Inventors: Fawzy T. Abdelmalek, 12807 Willowyck Dr., St. Louis, Mo. 63146; Michael J. Rutsch, 8329 S. 75 East Ave., Tulsa, Okla. 74133

[21] Appl. No.: 586,248

[22] Filed: Jan. 16, 1996

[51] Int. Cl.$^6$ ............................................. F25J 3/00
[52] U.S. Cl. ............................................. 62/632; 62/929
[58] Field of Search ............................................. 62/632, 929

[56] References Cited

U.S. PATENT DOCUMENTS

| | | | |
|---|---|---|---|
| 4,459,142 | 7/1984 | Goddin, Jr. | 62/929 |
| 4,675,035 | 6/1987 | Apffel | 62/929 |
| 4,681,612 | 7/1987 | Obrien et al. | 62/929 |
| 5,335,504 | 8/1994 | Durr | 62/632 |

OTHER PUBLICATIONS

Shah, V.A. et al, "Landfill Gas to High BTU Sales Using Selexol Solvent Process" Lincolnshire Ill., Mar. 27–29, 1990.

Epps, Rick; "Processing of Landfill Gas For Commercial Applications: The Selexol Solvent Process" Jun. 15, 1992, Washington, D.C.

*Primary Examiner*—Ronald C. Capossela
*Attorney, Agent, or Firm*—Peoples, Hale & Coleman

[57] ABSTRACT

Waste landfill gases are treated and separated by a combination of gas cleaning, gas compression, gas cooling, and gas absorption processes to produce high quality liquefied natural gas, liquefied carbon dioxide and compressed natural gas products.

9 Claims, 2 Drawing Sheets

PROCESS FOR SOLIDS WASTE LANDFILL GAS TREATMENT AND SEPARATION OF METHANE AND CARBON DIOXIDE

BACKGROUND OF THE INVENTION

1. Field of the Invention

This invention relates to a process and a method for treating and separating methane and carbon dioxide gases from landfill gases gathered at a landfill site.

As it is told, landfill gases when released into the atmosphere become a source of global warning greenhouse gas and smog-forming volatile organic gaseous emissions. The present Environmental regulations require that Landfill sites must be equipped with approved gas collection systems to control and prevent release of odors and landfill gaseous products into the environment. A gas collection system is employed to provide a negative pressure to pull out the landfill gas and to maintain low surface concentrations of gas at the ground surface, the collected gas is normally burned in boilers or flared into the atmosphere.

A typical landfill collection gas system consists of vertical and horizontal wells collecting gas from decaying organic matter at various levels undergound, the wells are connected by a pipe header at the ground surface. Oxygen sensor continuously monitor potential air migration and controls the landfill collection process to prevent atmospheric air from entering the system.

A typical landfill gas contains by volume basis an average of approximately 55% methane, 40% carbon dioxide, 2.3% nitrogen, 0.6% oxygen, 2% water vapor, less than 100 parts per million (PPM) of hydrogen sulfide and other insignificant smaller amounts of sulfur and hydrocarbon compounds.

In the present invention landfill gas is processed for treating and separating the methane and carbon dioxide to produce high quality liquified natural gas (LNG), liquefied carbon dioxide and compressed natural gas (CNG) products. A higher Octane more uniform methane fuel (natural gas) may be produced and conveyed into the natural gas utility pipe lines for domestic use, maybe produced as Compressed Natural Gas (CNG) for fueling vehicles similar to motor cars, tracks, busses, etc. or maybe produced as Liquified Natural Gas (LNG) to drive heavy equipment similar to railroad locomotives and marine entries, and for other uses that provide both economic and environmental benefits.

Carbon Dioxide gas maybe processed to produce liquefied carbon dioxide gas products that maybe tracked off site or conveyed by a pipe line to remote chemical manufacturing facilities for further processing and manufacturing of chemical products. The carbon dioxide separated from the landfill gas will replace a part of industrially produced carbon dioxide that require burning fossil fuel, thus providing the potential for both economic and environmental benefits.

A typical landfill site may produce between 1.0 and 15.0 million standard cubic foot per day (MMSCFD) of land fill gas. A system that treats 1.0 MMSCFD of landfill gas may produce up to 5,000 gallons per day of Liquefied Natural Gas (LNG) and 20 tons per day of Liquid Carbon Dioxide.

In the present invention, gas compression and cooling processes are employed to liquefy and separate most of the carbon dioxide gas from the methane gas. The landfill gas received from a gas collection system is cleaned by activated carbon to remove most of the hydrocarbon gas contaminants contained therein. The gas flowing from the low pressure cleaning step is then received by a multi stage gas compressor, where the gas pressure is increased and simultaneously cooled in four stages of compression and aftercoolers. The number of compression stages and the range of the cooling temperatures to liquefy the carbon dioxide gas contained in the landfill gas mixture will vary depending upon the chemical composition of landfill gases and the required degree of the methane gas purification through the compression and cooling steps. The carbon dioxide contained in the mixture of the landfill gas maybe condensed and removed at system pressures above 1800 pisg and at condensing temperatures that vary depending upon the content of the carbon dioxide in the landfill gas mixture. A liquid chiller or cryogenic refrigeration system is used to cool the gas to below 20° F. temperature to achieve more than 85% carbon dioxide removal. The more volatile gas impurities similar to methane and hydrocarbons contained in the liquified carbon dioxide flowing from the condensing step is then vented by expanding the low temperature liquid carbon dioxide from 1800 psig pressure level to approximately 200 psig without forming ice. Physical adsorption of trace impurities in activated carbon bed maybe used to produce high quality, product. A methane rich gas mixture containing more than 90% methane and less than 10% carbon dioxide flowing from the fourth stage compression is then conducted to a carbon dioxide absorption system, where an absorption fluid (solvent or amine based fluid) removes more than 95% of the remaining carbon dioxide from the methane gas. A typical gas stream treated for producing Liquid Natural Gas (LNG) must be purified to a minimum of 95% methane and with not more than 0.5% carbon dioxide. Liquid carbon dioxide separated after the fourth stage compression aftercooler maybe further purified by adsorption to provide a high grade quality product. Carbon dioxide and methane gas mixture released from regenerating the absorbing fluid in multiple step flashing vessels and from a low pressure regenerator vessel is recycled back to combine with the landfill main gas stream entering the multi-stage compression for 100% recycling and removing the carbon dioxide gas.

Liquefied Natural Gas is produced by cooling and condensing the methane gas to below −200° F. by exchanging heat with a cryogenic gas circulating in a closed turbo expander-compressor system. The cryogenic cooling effect must be enough to liquefy more than 80% of the compressed methane gas. The uncondensed methane contaminated with oxygen and nitrogen gases are vented and utilized for fueling the gas driven engines for the gas compression steps. The cryogenic gas stream flowing from a heat exchange system is conducted in a closed circuit to a gas compressor driven by the gas expander to provide dynamic loading to the expander. Compressed natural gas (CNG) at high pressure of up to 5000 psig for fueling automotive vehicles is produced by pumping a stream of the liquid natural gas (LNG) to the required high pressure level and by evaporation of said high pressure liquid in a heat exchanger using an auxiliary heat source.

2. Description of the Prior Art

The present invention employs a combination of gas compression and cooling processes to achieve separation of gas components at their thermodynamic equilibria points. The invention also employs gas purification and absorption process to remove trace amounts of carbon dioxide that is not economically possible to be removed by the liquefaction process and remains in the gas mixture steam flowing from the fourth stage compression and cooling step.

In the prior art, methods of removing carbon dioxide from landfill gas are limited to chemical or physical absorption and preamble membrane separation which occurs at much lower operating gas pressures. A chemical or physical absorption precesses typically employ an aqueous alkanolamine solution or a solvent to contact the gas stream in a trayed or packed vessel (the fluid contactor). The amine solution is a weak organic base which removes the carbon dioxide from the gas stream. The $CO_2$-rich amine stream which is loaded with carbon dioxide is heated and flashed at much lower pressure into a second trayed vessel (the regenerator) to produce a $CO_2$-lean amine. The combination of lower pressure and higher temperature cause a reversal of the chemical reactions which occurred within the fluid contactor, carbon dioxide is released from the amine solution or the solvent fluid and is vented through the top of the regenerator. Advantages of the chemical or physical absorption processes are achieving low concentrations of carbon dioxide in the methane gas; disadvantages, include high capital and operating costs, high fuel consumption, complexity of operations and costly oversized equipment to remove high content of carbon dioxide (30% or more by volume).

In permeable membrane process, membranes separate gases by selective permeation of the gases in contact with the membrane. The gases move across the membrane barrier as a result of imposed partial pressure gradients. The gases are separated based on diffusivity through the membrane material. The membrane material can be one of several molecular sieves depending on the composition of the mixture of gases to be separated. Higher quality and purity of product, require two or more stages of membrane separators and recycling intermediate concentrations of gas stream back to the inlet of the first stage membrane system. Advantage for using permeable membranes are ease of operation and a higher degree of gas separation is achieved. Disadvantages include higher initial cost, higher maintenance cost, higher operating cost, expensive replacements of membranes, and costly oversized equipment to recycle and reheat a large percentage of the gas stream entering the first membrane stage.

Neither, the carbon dioxide gas absorption nor the permeable separation processes for treating a landfill gas containing 30% (vol.) or more of carbon dioxide, has proven to be economically attractive for treating landfill gases from sites that produce less than 5 MMSCFD specially when additional costs will be needed to compress the treated methane gas for producing liquid natural gas (LNG) and compressed natural gas (CNG). The present invention utilizes the energy needed for the methane gas and carbon dioxide gas liquefaction process and takes advantage of most of this energy to substantially separate the bulk of the carbon dioxide contained in the compressed landfill gas stream, thus reducing the energy needed for the absorption step by reducing the percentage of carbon dioxide to be absorbed.

At higher pressures and at lower temperatures carbon dioxide gas progressively condenses as its thermodynamic points of equilibria that correspond to its content in the mixture of the compressed landfill mixture of gases. The process takes advantage of the energy needed to produce compressed natural gas (CNG) and liquid natural gas (LNG) to simultaneously remove the carbon dioxide as liquefied carbon dioxide (liquid $CO_2$) product, providing an economical solution for the landfill gas treatment and utilization.

The present invention employs a thermally regenerative organic based amine absorbent or solvent fluid to absorb most of the trace amount of carbon dioxide contained in the methane rich gas stream flowing from the carbon dioxide liquefaction step. Regenerative absorbents and solvents have been used in the past for scrubbing carbon dioxide ($CO_2$) hydrogen sulfide ($HSO_2$) and other landfill gas contaminants. Well known thermally organic amines as Monoethanlamine and Diethanolamine have been widely used for $CO_2$ absorption. Commercially known carbon dioxide absorbent products similar to Selexol™ has been developed by Union Carbide Corporation.

In the present invention a methane rich gas mixture flowing at above 1800 psig containing less than 10% carbon dioxide is treated with an organic amine absorbent (similar to Selexol™) to remove the carbon dioxide at a relatively low liquid to gas ratio (L/G), resulting in a lower energy consumption rate, and reduced power requirements. The process in the present invention for treating landfill gas provides the combination of producing compressed national gas (CNG) while simultaneously removing the carbon dioxide; firstly by compression and cooling, and secondly by absorption of the remaining low content of carbon dioxide in the mixture of gas stream flowing from the carbon dioxide liquefaction step.

A preferred embodiment of the present invention is the absorption step of the $CO_2$ which occurs at a relatively higher pressure above 1800 psig and the multiple flash regeneration of the absorbing fluid that occurs in multiple flashing vessels vented to the suction side of corresponding suction pressure of multiple compression stages to reduce the pressure of the absorbing fluid and recycle the vented gas. The high partial pressure of the carbon dioxide in the absorber, and in the regenerator improves the absorption and regeneration rates and reduces the liquid to gas ratio (L/G). Another advantage of the present invention, is that most of the trace contaminants in the landfill gas including chlorinated hydrocarbons, hydrogen sulfide, aromatics, as well as water are removed from the gas stream firstly; by activated carbon adsorption and secondly; during the compression and cooling stages that are condensed and removed in the early stages of compression.

The high percent regeneration of the absorbent liquid flowing from the last flashing vessel is achieved by increasing the temperature and further decreasing the pressure of the absorbent fluid to effect evaporation most of the $CO_2$ gas which is recycled and combined with the main landfill gas stream flowing to the first stage of the gas compression system. The regenerated carbon dioxide lean absorbent liquid removed from the regenerator vessel is then pumped back to the absorber vessel. The organic absorbent must be nonvolatile, have a low vapor pressure to prevent vapor losses in the regeneration step and must exhibit high selectivity for absorbing carbon dioxide from the methane gas, have low liquid to gas molar ratio (L/G), and have excellent stable physical characteristics. The absorbent capacity to remove $CO_2$ is normally decreased in the presence of hydrogen sulfide which reacts with the absorbent forming stable sulfides. Filtering of the recycled absorbent fluid and providing make up of the losses by adding fresh absorbent will be required for a continuous operation.

Since organic amine solvents are commercially established and available, the process designer can evaluate and make the selection of absorbent for the process. The physical and chemical composition of the solvent, its absorption and regeneration characteristics are considered outside the scope of this application.

SUMMARY OF THE INVENTION

Figure 1:
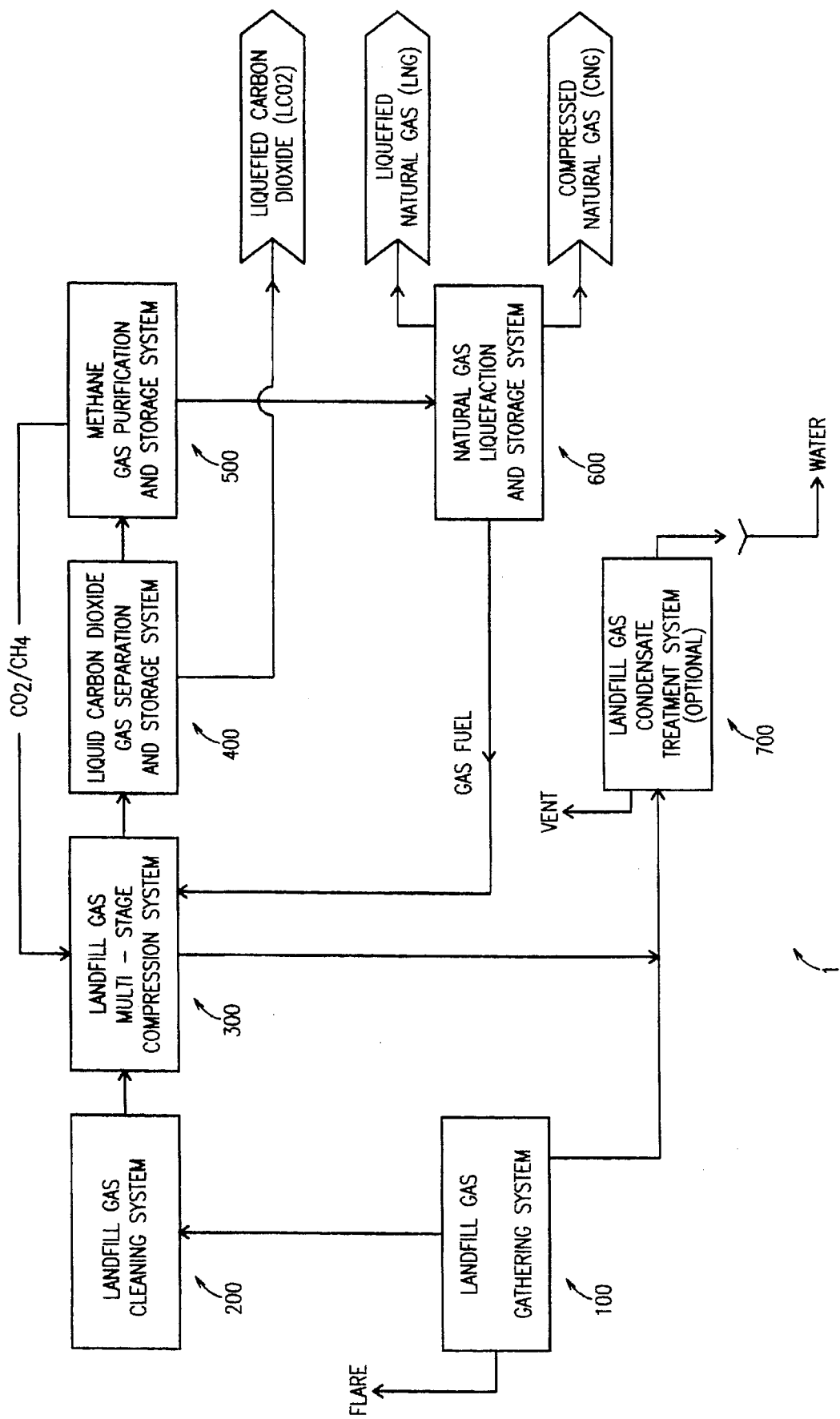
FIG. 1: is a simplified block diagram for the landfill gas treatment system

It is therefore a principle object of the present invention to provide an improved landfill gas treatment system which employs gas cleaning, compressing, cooling, absorbing, and liquefying processes for separating high quality methane from carbon dioxide and for removing other impurities contained therein.

It is further an object of the present invention to economically produce from landfill gases a high quality liquified natural gas (LNG) product.

It is further an object of the present invention to economically produce from landfill gases a high quality liquefied carbon dioxide product.

It is further an object of the present invention to economically produce from landfill gases a high quality compressed natural gas (CNG) product.

It is further an object of the present invention to remove trace amounts of carbon dioxide contained in the stream of compressed methane gas by a regenerative absorbent fluid circulating between a fluid contactor and a regenerator vessels.

It is further an object of the present invention to conserve energy while reducing emissions by gathering and treating landfill gases that otherwise would be wastefully vented or flared into the atmosphere.

It is further an object of the present invention to utilize landfill gases as a major alternative source to supply carbon dioxide products needed for a wide range of industrial processes.

It is further an object of the present invention to conserve the energy presently used to produce carbon dioxide products by burning fossil fuel resources and saving this fuel for other energy needs.

It is further an object of this invention to utilize underground deep well storage vessels to provide safe and economical means for storage of high pressure gas and liquefied gas products.

It is also an object of this invention to use a gas expander-compressor system to provide cryogenic cooling for liquefaction of most of the purified methane gas.

It is also an object of the present invention to compress the landfill gases with compressors driven by natural gas fueled engines utilizing a lower quality methane gas stream vented from the methane liquefaction step to provide economic means for the gas compression while purifying the liquid methane products.

The above and other objectives and advantages of the present invention will become apparent from the following specifications, drawings, and claims. It will be understood that particular embodiments of the invention are shown by a way of illustration only and are not as limitations to the invention. The principle features of this invention maybe employed in various embodiments without departure from the scope of the invention.

The landfill gas treatment system is comprised of seven parts: landfill gas gathering; landfill gas cleaning; carbon dioxide liquefaction; methane gas treating; methane gas liquefaction, underground gas storage and product handling system, and landfill gas water condensate treatment system.

Part 1; Landfill gas gathering: The landfill gas is gathered from a number of shallow wells drilled into the landfill. The wells are connected to a blower via a low pressure gas gathering pipe line. The blower increases the gas pressure from less than atmospheric level (vacuum) to a low pressure of approximately 2 pounds per square inch (psig). The landfill gas flowing from the blower is conducted to the landfill gas cleaning facility.

Part 2; Landfill gas cleaning: water vapor condensed in the low pressure gas flowing from the gas blower is firstly separated before entering a low pressure activated carbon gas absorption system to remove most of the hydrocarbon contaminants. The gas is then conducted to a multi-stage high pressure compressor where the gas in compressed to above 1800 psig. The gas stream is intercooled between the consecutive stages of compression causing a major part of the water vapor, chlorinated hydrocarbons, aromatics, other hydrocarbons, and hydrogen sulfide, to condense and be removed in the early stages of compression. A reciprocating piston type compressor unit with four stages may be required to achieve a pressure above 1800. Approximately 85% (vol.) or more of the carbon dioxide contained in the landfill gas will be removed by the gas compression and cooling step. A Methane rich gas stream with carbon dioxide content of less than 10% (vol.) is then conducted to the carbon dioxide absorption step.

Part 3; Carbon dioxide liquefaction: In the process of compressing and cooling the mixture of landfill gases as described in Part 2, carbon dioxide vapor condenses when thermodynamic saturation points are reached at corresponding equilibria partial pressures and temperatures in the gas mixture which occurs at a landfill gas total pressure above 1800 psig and at temperature below 50° F. At lower content of $CO_2$, lower corresponding equilibrium temperatures are needed, which can be achieved by a secondary liquid chiller or a cryogenic refrigeration system. The liquefied carbon dioxide ($LCO_2$) product is then treated to remove most of the trace hydrocarbon contaminants; firstly by flashing and venting the more volatile gas components by decreasing the pressure of the liquid carbon dioxide from approximately 1800 psig to below 200 psig without forming ice; secondly by physical adsorption of the volatile hydrocarbon products in activated carbon bed. The high quality liquid carbon dioxide product is then conducted to a storage vessel system or maybe transported through pipe lines or by liquid carbon dioxide tank trucks.

Part 4; Methane gas treating: a methane gas stream at a pressure above 1800 psig containing less than 10% (vol.) carbon dioxide is then conducted to a carbon dioxide gas absorption system. The methane rich gas stream enters a multi-stage trayed or packed high pressure contactor vessel where the gas is scrubbed by a carbon dioxide absorbing solution (amine or solvent), the purified methane gas stream flowing from the absorbing vessel is then conducted through a mist eliminator to remove any moisture that may be entrained and carried out with the gas stream. A purified high pressure methane gas stream is then conducted to a storage vessel system.

A $CO_2$ rich fluid stream flowing from the absorbent contactor vessel is then flashed in multiple flash vessel vented at multiple pressure levels that correspond to the suction pressures of the multi-stage reciprocating compressor unit. The fluid is reheated before entering a low pressure regenerator vessel operating at the suction pressure of the first stage compression stage. The $CO_2$ lean fluid stream flowing from the regenerator vessel is then cooled by exchanging heat with the relatively warmer $CO_2$ rich fluid stream. A secondary cooling source (liquid chiller) may be used to further cooling the fluid before entering the contactor vessel.

A mixture of carbon dioxide, methane and water vapor stream vented from each of the multiple flash vessels and the regenerator vessel is then recycled and combined with the main landfill gas stream flowing through the multi-stage compression unit.

Part 5; Natural Gas Liquefaction: The Liquified Natural Gas (LNG) product is produced by allowing a stream of the purified high quality compressed methane gas in Part 4 to be adiabatically expanded to approximately 200 psig and to be cooled to a temperature below −200° F. through cryogenic heat exchanger utilizing a gas expander-compressor system for producing cryogenic cooling. The liquified natural gas stream maybe conducted to storage or maybe transported in pipe lines for loading into liquid natural gas trucks. Uncondensed methane gas containing volatile gas components similar to oxygen and nitrogen are vented and used as fuel to drive the gas fueled engines for the compression steps.

Part 6; Underground gas storage: A preferred embodiment of the present invention is using an underground storage vessel system for the compressed natural gas (CNG), liquified natural gas (LNG) and liquid carbon dioxide ($LCO_2$). The underground storage system is employed to provide a safe and economic means for product storage that is not exposed to damage by vandalism or accidents, providing a more economical means for high pressure gas products storage.

Part 7; Landfill site water vapor condensate system; the water vapor condensate from the several steps of gas compression aftercoolers/liquid separators are collected and treated in an air stripping system to remove dissolved contaminants similar to chlorinated hydrocarbons, hydrogen sulfide, aromatics and other hydrocarbons before discharging into surface waterways or into a secondary waste water treatment system.

OPERATION:

FIG. 1 indicate a simplified block diagram for the landfill gas treatment for separation of methane and carbon dioxide gases, and for producing purified methane, liquified natural gas (LNG), compressed natural gas (CNG) and liquified carbon dioxide (L-$CO_2$) products. The process is indicated in seven parts. Landfill gas gathering system 100; landfill gas cleaning system 200; landfill gas multi stage compression system 300; carbon dioxide liquefaction, purification and storage system 400; compressed methane (natural gas) purification and storage system 500; natural gas liquefaction system 600; and landfill water condensate treatment system 700.

Figure 2:
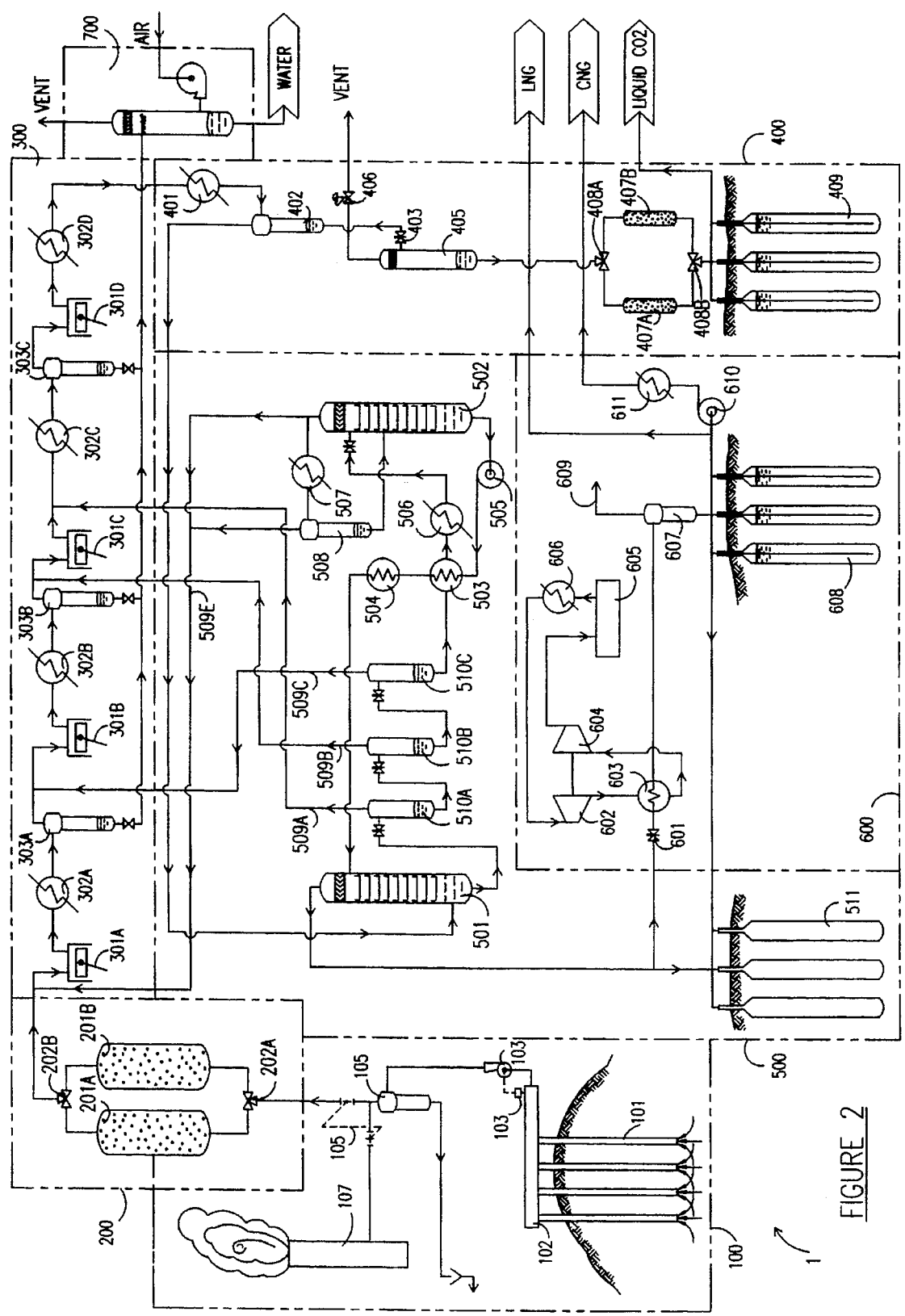
FIG. 2: is a schematic process flow diagram for the landfill gas treatment system

FIG. 2 indicate a more detailed process schematic diagram for the invented process. The landfill gathering system 100 has vertical wells 101 drilled in the ground to collect landfill gases from multiple points up to a header 102 above the ground surface. A low pressure blower 103 applies a vacuum on the suction side of the blower to withdraw landfill gas without causing migration of atmospheric air from the ground surface into the landfill gas. Oxygen sensor 104 located near the blower inlet controls the vacuum applied on the landfill gathering system to prevent air migration. The blower 103 provides gas discharge at a pressure range below 2 psig. A liquid separator 105 removes water vapor and heavy hydrocarbons that may condense in the pressurized landfill gas flowing stream from the blower 103. A two way control damper 106 will direct the landfill gas to either a flare 107 or to a low pressure gas cleaning system 200.

System 200 employs multiple activated carbon adsorption columns to remove most of the trace sulfur and hydrocarbon volatile gas compounds contained in the landfill gas stream. The cleaned landfill gas flowing from system 200 at near atmospheric pressure and near ambient temperature then enters a multi stage high pressure compression system 300.

System 300 employs a multi stage gas compressor unit, the number of the compression stages may vary depending on the landfill gas composition, gas cooling temperatures, and the required delivery pressure for the natural gas and carbon dioxide products. A reciprocating piston type, multi-stage compressor is preferred to compress the gas to above 1,800 psig. The first stage compression 301A raises the gas pressure to approximately 70 psig. A first stage aftercooler 302A cools the compressed gas to within 15° F. of the surrounding ambient temperature, and a first stage liquid separator 303A removes the condensed gas water vapor and heavier hydrocarbon compounds. The cooled landfill gas flowing from the first stage liquid separator 303A is then conducted to enter a second stage compression 301A which raises the gas pressure to approximately 240 psig. A second stage aftercooler 302B provides cooling for the gas stream to within 15° F. of the surrounding temperature and a second stage liquid separator 303B removes the condensed water vapor and heavier hydrocarbon compounds. The cooled landfill gas flowing from the second stage liquid separator 303B is then conducted to the suction side of a third stage compression 301C which raises the gas pressure to approximately 630 psig. A third stage aftercooler 302C provides cooling for the gas stream to within 15° F. of the surrounding ambient temperature, and a third stage liquid separator 303C removes the condensed water vapor and heavier hydrocarbon compounds. The cooled gas stream flowing from the third stage liquid separator is the conducted to the suction side of a fourth stage compression 301D which raises the gas pressure to above 1800 psig. A fourth stage aftercooler 302D provides cooling for the gas stream to reduce its temperature to within 15° F. of the surrounding ambient temperature. The gas flowing from the fourth stage aftercooler is then conducted to system 400 into a gas cooler 401 to subcool the gas mixture to a temperature well below 20° F. utilizing an auxiliary, low temperature refrigeration source similar to an ammonia direct expansion refrigeration system or a low temperature cryogenic cooling system. A Liquified carbon dioxide stream flowing from the liquid separator 402 is conducted to a pressure reducing valve 403 to enter receiver vessel 405 where the pressure is reduced to near 200 psig. A smaller part (10% or less) of the liquid carbon dioxide that contains most of the dissolved volatile gas components similar to methane, nitrogen and oxygen are flashed and vented to the atmosphere. The purified liquid carbon dioxide it then treated through activated carbon absorber 407A and 407B, control valves 408A and 408B provide control to alternate the adsorbing towers 407A and 407B. The treated high quality liquefied carbon dioxide product is then conducted to storage vessel system. Pressure regulating valve 406 is employed to provide adjustments to the required liquid $CO_2$ storage pressure. A methane rich gas stream 90% or more (vol) flowing from the separator 402 is then directed to the methane purification system 500.

The methane purification system 500 employs a regenerative amine or solvent based absorption fluid to remove the relatively low content (less than 10% vol.) of carbon dioxide contained in the methane gas stream. Contactor vessel 501 maybe of a trayed or packed type where a $CO_2$ lean absorbing fluid flowing downwardly comes in contact with a methane rich gas stream flowing upwardly in the contactor vessel. A $CO_2$ rich absorbing fluid flowing from the bottom of the contactor vessel is conducted to a three stage flashing vessels and a regenerator vessel connected in a series arrangement to reduce the pressure of the $CO_2$ rich solvent from a high pressure above 1800 psig down to approximately atmospheric pressure. In the first flash vessel 510A the pressure of the absorbing fluid pressure is reduced to the suction pressure level of the fourth compression stage of approximately 630 psig, in a second flash vessel 510B the absorbing fluid pressure is reduced to the suction pressure level of the third compression stage of approximately 240 psig, in a third flash vessel 510C the absorbing fluid pressure is reduced to the suction pressure level of the second compression stage of approximately 70 psig. A reverse heat exchanger 503 provides thermal energy to heat the fluid flowing from the third flash vessel 510D by cooling a reverse stream of a $CO_2$ lean absorbing fluid flowing from a regenerator vessel 502. A $CO_2$ rich absorbing fluid flowing from the heat exchanger 503 is further heated in a heat exchanger 506 with a secondary heating source similar to a hot water or a steam heating coil before entering the regenerator vessel 502. The heated $CO_2$ rich fluid is then allowed to flash in the regenerator vessel 502 to a lower pressure corresponding to the inlet pressure of the first stage compression at near atmospheric pressure, where most of the carbon dioxide gas contained therein is released. The released mixture of $CO_2$, methane gas and water vapor is then conducted to the suction side of the landfill gas compressor first stage compression 301A.

The mixture of carbon dioxide, methane and water vapor released from the first flash vessel 510A is vented through a conduit 509A to the suction side of the fourth stage compression cylinder 301D, and that released from the second flash vessel 510B is vented through a conduit 509B to the suction side of the third stage compression cylinder 301C, and from the third flash vessel 510C is vented through a conduit 509C to the suction side of the second stage compression cylinder 301B. When heat is used for regeneration, the mixture of carbon dioxide, methane and water vapor released from the regenerator vessel 502 maybe cooled in a heat exchanger 507 and water vapor condensate is removed in liquid separator 508 and recycled to the regenerator vessel 502. The carbon dioxide, methane and any uncondensed water vapor is then recycled through a conduit 509E to the suction side of the first stage compression cylinder 301A. The methane gas flowing from the top of the contactor vessel 501 is conducted through a mist eliminator producing a purified compressed methane gas stream which is then conducted to a methane gas storage system 511.

In system 600 a Liquified Natural Gas (LNG) product is produced by allowing the purified methane gas flowing from system 500 at approximately 1800 psig to adiabatically expand through expansion valve 601 to a lower pressure of approximately 200 psig, cooled to below −200° F. through a cryogenic heat exchanger 603 which is installed in a closed turbo expander 602 and compressor 604, the closed cryogenic system includes a booster compressor 605 and gas cooler 606. The process of adiabatic expansion of the methane gas stream through the expansion valve 601 and the cryogenic cooling (utilizing the gas expander 602) will provide means to reduce the gas pressure and provide cooling needed for the liquefaction of the methane gas stream. The liquid methane gas stream flowing from a heat exchanger 603 is then removed in liquid separator 607 and conducted to a liquid methane storage vessel system 608. A vent connection 609 relieves the uncondensed mixture of the methane gas that contains most of the volatile gas components similar to oxygen and nitrogen and is conducted to fuel the gas driven engines used for driving the gas compression equipment.

The high quality liquid methane gas (LNG) maybe conducted through a pipe line for transportation by trucks or rail. The expanded and tempered cryogenic gas stream flowing from heat exchanger 603 is conducted in a closed circuit to the inlet side of a gas compressor 604. Compressor 604 is directly connected to the gas expander 602 to provide dynamic loading and to recover the power produced by the expander. A high pressure multi-stage booster compressor 605 and an aftercooler 606 used to recompress and recirculate the expanded cryogenic gas stream to the high pressure side of the cryogenic cooling cycle providing a closed cryogenic circuit for the methane gas liquefaction process.

A liquid natural gas pump 610 and a gas evaporator 611 installed downstream of the liquid natural gas storage vessels are used to provide compressed natural gas (CNG) product for vehicle fueling.

System 700 is a low pressure air stripping water treatment system. The water vapor condensate streams flowing from the multiple stage compression aftercoolers and liquid separators are directed to an air stripping and water treatment system 700 to remove the dissolved hydrocarbons, sulfur compounds and aromatics that maybe condensed and dissolved in the water condensate. The stripped gases maybe vented or flared as required. The treated water vapor condensate stream maybe released into the ground surface waterways or into a secondary waste water treatment system. Since the air stripping, water treatment systems are commercially available this step of the process for water vapor condensate cleaning is considered outside the scope of this application.

For purposes of simplicity, the drawings do not indicate the prior art means for process controls, piping specialities, electric and electronic specialities and other details which shall be necessary for the complete operable system. Since the hardware and software of process controls are well known and commercially established and available, the process designer can evaluate and select the particular characteristics of the controls required for the maintenance of the process design operating parameters. The general basic features of the temperature, pressure, and mass flow controls are employed to achieve the process design limitations. It is understood that particular embodiments of the invention are shown by way of illustration only and not as limitation to the invention. The principle feature of the process maybe employed in various embodiments without department from the scope of the invention.

What is claimed:

1. A process for Landfill gas treatment and separation of methane gas and carbon dioxide gas contained therein, and for producing liquid natural gas, liquid carbon dioxide, and compressed natural gas products, the process that comprises;

gathering a landfill gas stream from solids waste treatment landfill site with a vacuum collection system and pressurizing the collected gas stream to above atmospheric pressure;

cleaning the landfill gas stream flowing from said gas collection system to remove condensed water vapor and trace sulfur and hydrocarbon compounds contained therein;

conducting the cleaned landfill gas flowing from the said gas cleaning step into a four stage gas compressor;

increasing the pressure and simultaneously cooling the landfill gas stream at each compression stage, wherein the first stage compression increases the gas pressure from approximately atmospheric pressure to approximately 70 psig, the second stage compression cylinder increases the gas pressure to approximately 240 psig, the third stage compression increases the gas pressure to approximately 630 psig and the fourth stage compression increases the gas pressure to above 1800 psig;

intercooling the compressed landfill gas stream flowing from the first to the second compression stage, from the second to the third compression stage, and from the third to the forth compression stage to maintain a near ambient temperature to effect cooling, condensing and removing water vapor and heavy hydrocarbon vapors contained in the gas stream flowing from a lower pressure to a succeeding higher pressure stage;

cooling the compressed landfill gas stream flowing from the fourth compression stage at above 1800 psig to approximately 20° F. temperature to substantially condense most of the carbon dioxide vapor contained therein;

separating liquid carbon dioxide from a methane rich gas stream;

scrubbing the methane rich gas stream flowing from the fourth compression stage with a solvent fluid injected at about 50° F. and approximately 1800 psig into a contactor vessel to absorb most of the carbon dioxide remaining in the gas mixture forming a $CO_2$-rich solvent fluid stream and a purified compressed methane gas stream;

conducting the $CO_2$-rich solvent fluid flowing from the contactor vessel at approximately 1800 psig into a first flash vessel to decrease its pressure to approximately 630 psig;

recycling a gas mixture stream released from the first flash vessel at approximately 630 psig to the suction of the forth stage compression;

conducting the $CO_2$-rich solvent flowing from the first flash vessel at approximately 630 psig to a second flash vessel where its pressure is decreased to approximately 240 psig;

recycling a second gas mixture stream released from the second flash vessel at approximately 240 psig to the suction of the third stage compression;

conducting the $CO_2$-rich solvent flowing from the second flash vessel at approximately 240 psig to a third flash vessel where its pressure is decreased to approximately 70 psig;

recycling a third gas mixture stream released from the third flash vessel at approximately 70 psig to the suction of the second stage compression;

heating the $CO_2$-rich solvent fluid flowing from the third flash vessel to a relatively higher temperature;

spraying the heated $CO_2$-rich solvent into a regenerator vessel operating at near atmospheric pressure to release most of the carbon dioxide remaining in the solvent fluid;

recycling the gas mixture stream flowing from the regenerator vessel to enter the suction of the first stage compression;

pumping a $CO_2$-lean solvent fluid flowing from the regenerator vessel to increase its pressure from near atmospheric pressure to above 1800 psig;

conducting the pressurized $CO_2$-lean solvent fluid into a reverse heat exchanger where the $CO_2$-rich solvent stream flowing from the third solvent flash vessel is heated and the $CO_2$-lean solvent stream flowing from the regenerator vessel is cooled;

further cooling the $CO_2$-lean solvent stream flowing from said reverse heat exchanger to a temperature below 50° F. before entering the contactor vessel to repeat the process of scrubbing the methane rich gas stream flowing from the carbon dioxide condensing step;

transporting and storing the purified methane gas flowing from the gas contractor vessel to a high pressure gas storage vessel;

treating the carbon dioxide liquid stream flowing from the fourth compression stage to remove most of the dissolved hydrocarbon contaminants contained therein through the steps of expansion in a flash vessel from above 1800 psig to approximately 200 psig and by physical adsorption of gases in an activated carbon bed.

transporting and storing the purified liquid carbon dioxide into a liquid carbon dioxide storage vessel.

2. The process of claim 1 wherein 85% (vol.) or more of the carbon dioxide gas contained in the landfill gas stream is condensed and removed thermodynamically by increasing the pressure of the landfill gas stream to above 1800 psig and decreasing its temperature to below 20° F. to produce 90% (vol.) or more quality methane gas.

3. The process of claim 1 wherein 95.0% (vol.) or more of the carbon dioxide gas contained in a compressed landfill gas is removed by the combination of gas compression, gas cooling and gas absorption by regenerable carbon dioxide solvent fluid to produce a high quality methane.

4. The process of claim 1 wherein the carbon dioxide and methane gas mixtures released from the step of regeneration of the carbon dioxide rich solvent fluid in multiple flashing vessels and from a low pressure carbon dioxide solvent regenerator vessel are recycled and combined for recompression with the main stream of the landfill gas in a closed cycle for effective continuous removal of carbon dioxide by liquefaction.

5. The process of claim 1 for producing a high quality natural gas product from a landfill gas stream gathered at a solids waste landfill site through the combination of gas cleaning steps; firstly by removing most of the volatile hydrocarbon and sulfur gas compounds through activated carbon adsorption bed; secondly by removing most of the carbon dioxide by liquefaction through compression and cooling and; thirdly by removing trace carbon dioxide gas by absorption with a regenerative amine absorber fluid.

6. The process of claim 1 for liquefying methane gas extracted from solids waste landfill site by the steps of methane gas expansion to approximately 200 psig and cryogenic cooling to below $-200°$ F.

7. The process of claim 1 for producing high quality compressed natural gas (CNG) by the steps of pressurizing a stream of liquid natural gas (LNG) to a pressure of up to 5000 psig and by evaporating said pressurized liquid natural gas to a gaseous state.

8. The process of claim 1 for producing high quality liquid carbon dioxide gas product from a landfill gas stream gathered at a solids waste landfill site through the combination of gas cleaning steps; firstly by removing most of the volatile hydrocarbon and sulfur gas compounds through activated carbon adsorption bed; secondly by liquefying most of the carbon dioxide gas of the landfill gas through compression of the landfill gas to above 1800 psig and cooling to below 20° F.; thirdly by removing the volatile hydrocarbon and other air gaseous components by flashing the liquid carbon dioxide to approximately 200 psig and; fourthly by physical adsorption of contaminants through activated carbon bed.

9. The process of claim 1 where underground deep well high pressure gas storage vessels are used for safe gas products storage.

* * * * *